US009254967B2

(12) United States Patent
Blochmann

(10) Patent No.: US 9,254,967 B2
(45) Date of Patent: Feb. 9, 2016

(54) MODULE FOR ALIGNING CONTAINERS AND METHOD FOR ALIGNING CONTAINERS

(75) Inventor: Erik Blochmann, Neutraubling (DE)

(73) Assignee: Krones, AG, Neutraubling (DE)

( * ) Notice: Subject to any disclaimer, the term of this patent is extended or adjusted under 35 U.S.C. 154(b) by 0 days.

(21) Appl. No.: 14/233,309

(22) PCT Filed: Jun. 28, 2012

(86) PCT No.: PCT/EP2012/062626
§ 371 (c)(1),
(2), (4) Date: Feb. 21, 2014

(87) PCT Pub. No.: WO2013/010771
PCT Pub. Date: Jan. 24, 2013

(65) Prior Publication Data
US 2014/0166436 A1 Jun. 19, 2014

(30) Foreign Application Priority Data

Jul. 20, 2011 (DE) .................... 10 2011 108 017

(51) Int. Cl.
B65G 47/24 (2006.01)
B65G 47/90 (2006.01)
B65G 47/84 (2006.01)
B67C 7/00 (2006.01)
B67C 3/24 (2006.01)
B65G 47/86 (2006.01)

(52) U.S. Cl.
CPC .............. B65G 47/24 (2013.01); B65G 47/847 (2013.01); B67C 3/24 (2013.01); B67C 3/242 (2013.01)

(58) Field of Classification Search
None
See application file for complete search history.

(56) References Cited

U.S. PATENT DOCUMENTS 5,581,975 A    12/1996  Trebbi et al.
6,354,427 B1    3/2002  Pickel et al.
7,278,451 B2   10/2007  Cavallari
(Continued)

FOREIGN PATENT DOCUMENTS

DE    19816239    10/1999
DE    200623531   11/2007
(Continued)

OTHER PUBLICATIONS

International Search Report dated Aug. 29, 2012 in corresponding PCT application PCT/EP12/062626.

Primary Examiner — Kavel Singh
(74) Attorney, Agent, or Firm — Onello & Mello LLP

(57) ABSTRACT

The invention relates to a device for treating containers (10), comprising a first movable transport unit (2) for transporting the containers (10) along a predetermined transport path (P), on which unit a plurality of clamp-like gripping elements (4) are arranged, wherein said gripping elements (4) can be switched between a closed state in which the gripping element (4) grips the container (10) and an open state in which the grip of the container (10) by the gripping element (4) is at least loosened. According to the invention, the transport unit (2) comprises a plurality of holding units (6) in addition to the gripping elements (4), which holding units can be brought into engagement with a mouth section of the container or which holding units support the bottom section of the container, wherein both a gripping element (4) and a holding unit (6) are assigned at least at intervals to at least one container (10) during the transport thereof by means of the device for the purpose of transporting said container.

32 Claims, 7 Drawing Sheets

(56) References Cited

U.S. PATENT DOCUMENTS

| | | | |
|---|---|---|---|
| 7,331,156 B2 * | 2/2008 | Hartness | B65G 17/323 198/470.1 |
| 8,349,270 B2 | 1/2013 | Winzinger et al. | |
| 8,590,277 B2 * | 11/2013 | Baroni | B67B 3/2033 53/300 |
| 8,602,770 B2 | 12/2013 | Stoiber et al. | |
| 2005/0268988 A1 | 12/2005 | Cavallari | |
| 2010/0289178 A1 | 11/2010 | Stoiber et al. | |
| 2011/0020172 A1 * | 1/2011 | Winzinger | B08B 1/00 422/1 |
| 2011/0138594 A1 | 6/2011 | Borgatti et al. | |
| 2013/0118534 A1 | 5/2013 | Winzinger et al. | |

FOREIGN PATENT DOCUMENTS

| | | |
|---|---|---|
| DE | 2009021792 | 11/2010 |
| DE | 2009025907 | 12/2010 |
| DE | 2009339809 | 1/2011 |
| EP | 0659683 | 6/1995 |
| EP | 2100815 | 9/2009 |
| EP | 2253452 | 11/2010 |
| GB | 2142900 | 1/1985 |
| WO | 2004014779 | 2/2004 |
| WO | 2010013207 | 2/2010 |

* cited by examiner

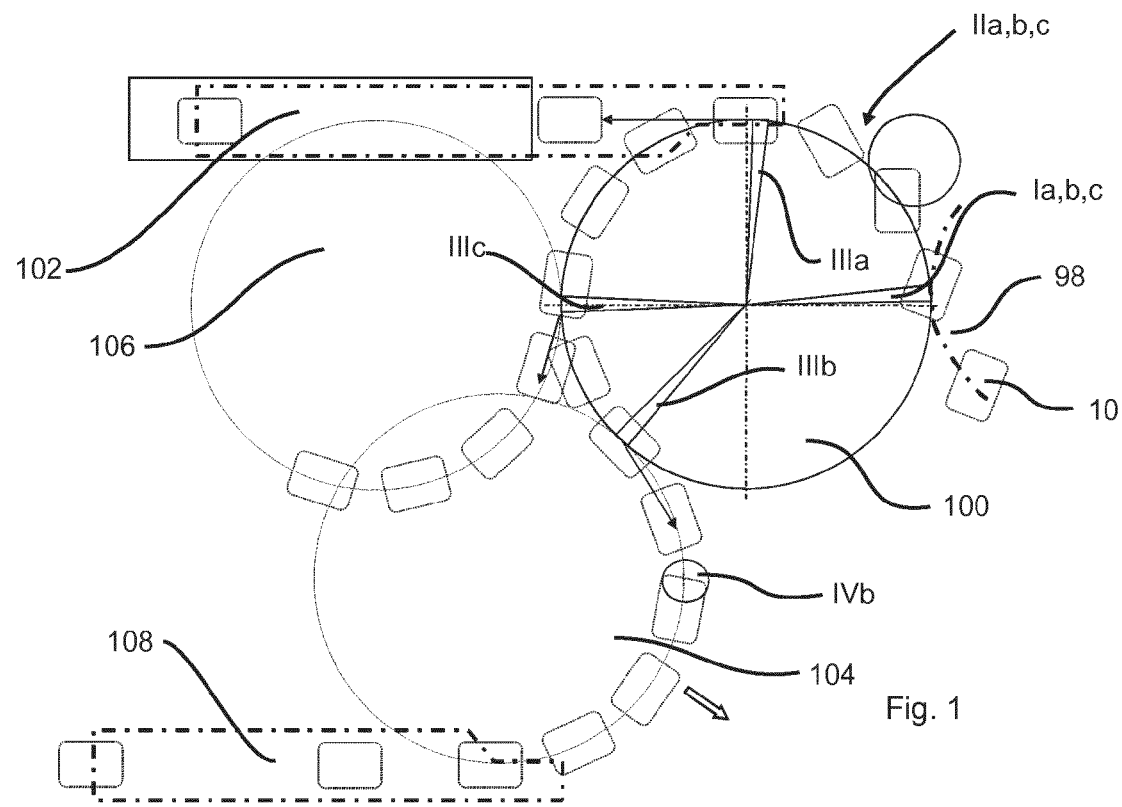
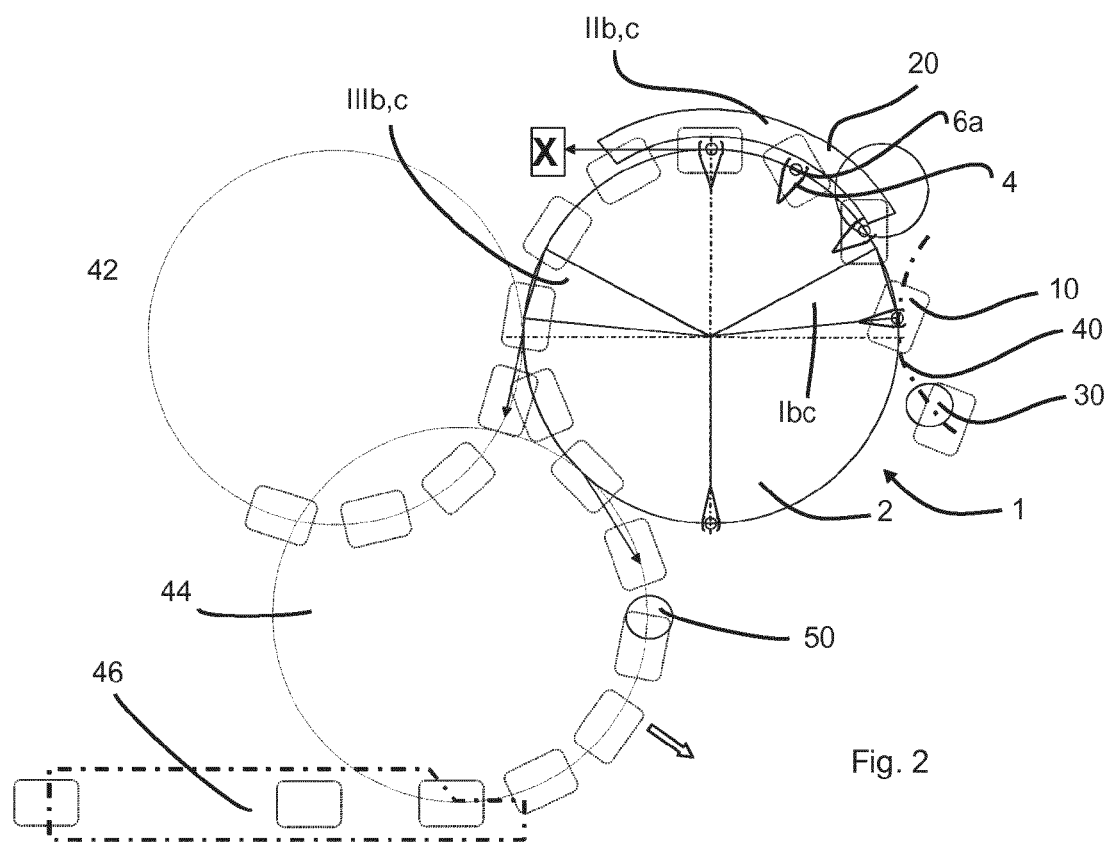

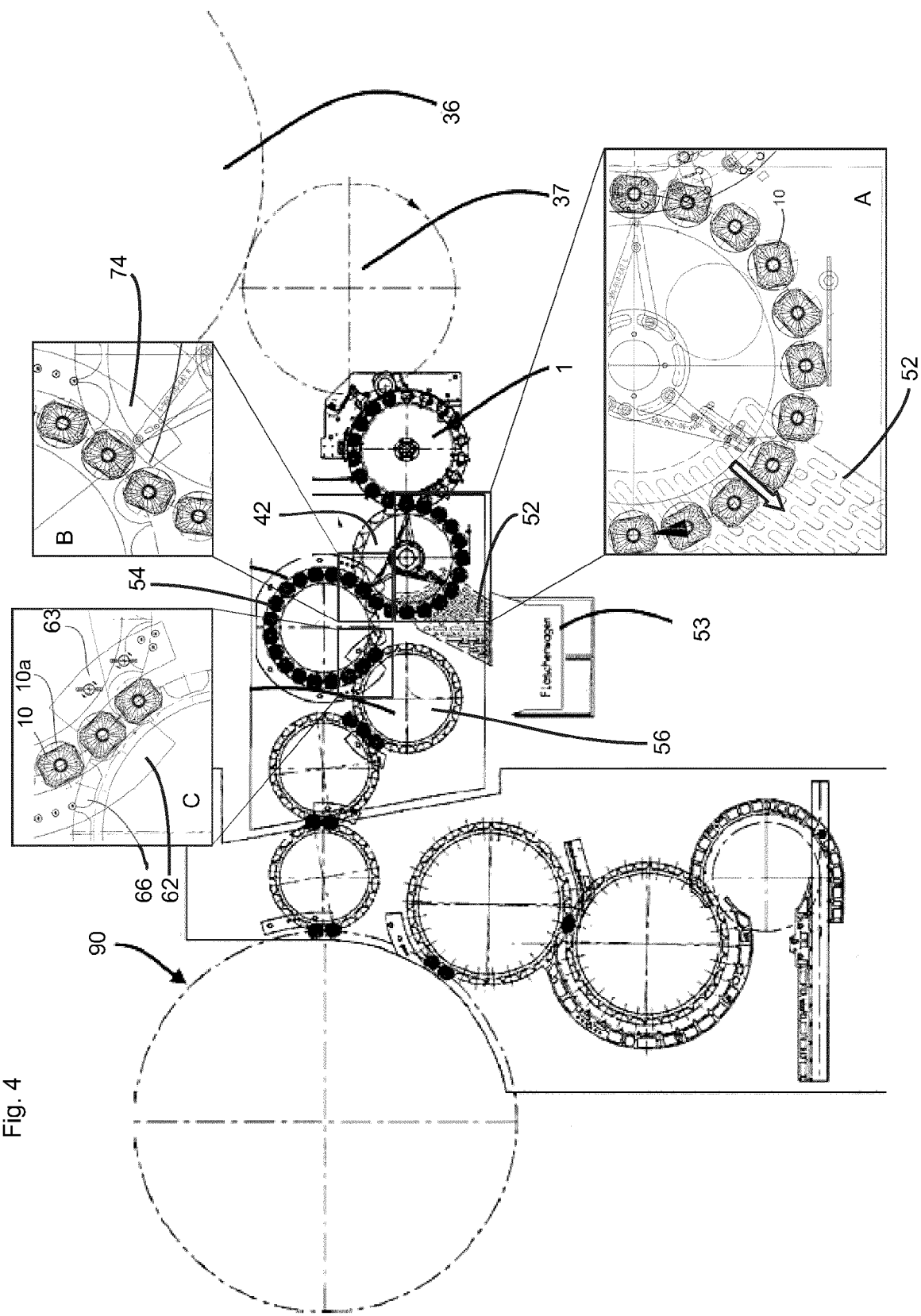

MODULE FOR ALIGNING CONTAINERS AND METHOD FOR ALIGNING CONTAINERS

The present invention relates to an apparatus and a method for producing plastics material containers. Apparatus and methods of this type have long been known from the prior art. In this case it is known inter alia for plastics material containers to be produced in production methods of this type by heated plastics material pre-forms being shaped to form the plastics material containers as a result of being acted upon with pressure. After that, these containers are filled with liquids, in particular beverages, and are finally closed. In this case those containers which do not possess a circular cross-section but cross-sections differing therefrom, such as for example elliptical cross-sections, are also known from the prior art. Special blow moulding machines, which have blow moulds accordingly made elliptical, are provided in the production of these cross-sections. In the case of the labelling and filling, however, containers of this type which have a non-circular cross-section sometime give rise to problems since the filling and labelling machines require an exact alignment of these containers. In addition, during the transfer to a conveyor or in an air conveyor an alignment may be necessary in order to prevent jamming for example in the conveying.

WO 2010/013207 A2 describes a plant for the blow moulding of plastics material containers, and in particular bottles. This plant has in this case a plurality of interchangeable blow moulds which form cavities for the shaping of the containers in each case.

DE 10 2009 033 809 A1 describes an apparatus for the treatment of containers with carrier sterilization. In this case holding elements for holding the containers are themselves sterilized by a cleaning device.

DE 198 16239 A1 describes an apparatus for the introduction and/or removal of containers into and out of a treatment room. In this case grippers are provided which are capable of being actuated by a control device and which fix the containers momentarily in the air lock chambers, preferably suspended without support at the base.

An apparatus for the conveying of piece goods is known from DE 10 2006 023 531 A1. In this case a plurality of grippers are likewise provided which are capable of being actuated by a control device and which fix containers momentarily in air lock chambers.

An apparatus for the treatment of containers with alignment of the containers has likewise been described in the German Patent Application No. 10 2010 054 792.1 which is not yet published. The subject matter of this publication is hereby also made the contents of the disclosure of the present application in its entirety.

The object of the present invention is to simplify the production of containers, in particular of containers with a non-circular cross-section, for example oval containers. In this case, in particular, the closing and labelling of the containers is also to be made easier. These objects are attained according to the invention by an apparatus and a method according to the independent claims. Advantageous embodiments and further developments form the subject matter of the sub-claims.

An apparatus according to the invention for treating containers has a first movable conveying device for conveying the containers along a pre-set conveying path. In this case a plurality of clamp-like gripping elements are arranged on this conveying device, these gripping elements being capable of being switched between a closed state, in which the container is gripped by the gripping element, and an opened state, in which a grip of the container (in particular an engagement in a region, in particular into an outer wall region and in particular also a mouth region) is at least loosened by the gripping element.

According to the invention the conveying device has, in addition to the gripping elements, a plurality of holding devices which are capable of being brought into engagement with a mouth region of the container or which support the container on the base region thereof, both (precisely) one gripping element and one holding device being associated—in particular for the purpose of conveying the container—with at least one container during the conveying thereof by the apparatus at least for a time.

According to the invention it is therefore proposed that there should be provided for conveying the containers both the gripping device and the holding device which co-operate during treating the containers. In this way, an advantageous orientation of the bottles, in particular an orientation with respect to the rotary setting of the containers, can be achieved. By means of the apparatus according to the invention it is possible to fall back upon previously known and proven systems which subsequently pass the containers into a treatment module. In the case of alignment modules known in part at present, containers are transferred by means of a gripping device on to a mandrel which dips into the containers. Various problems arise on account of this procedure. In this way, the transfers are in part not set properly, i.e. the mandrel does not dip exactly into the mouth of the containers. In addition, the problem can arise that the guide fittings turn the containers during the dipping of the conveying mandrel. Furthermore, the problem can arise that a lifting cam may press too long on the guide fittings and, in this way, may turn the container.

Two possibilities are proposed in this case for a holding device, namely a holding mandrel which engages in the mouth of the containers on the one hand and a holding device which supports the container on its base, i.e. in particular from below, on the other hand. If the holding device is designed in the form of a holding disc of this type, this holding disc will be situated below the gripping elements. The holding disc is preferably designed in this case in the form of a rotatable holding disc.

It is preferable for an engagement of the gripping device to be loosened in an opened state of this gripping device at least to such a degree that a rotation of the container with respect to the longitudinal axis thereof relative to the gripping device is possible. The gripping device, however, can also be opened to such a degree that even a movement of the plastics material container in the longitudinal direction thereof with respect to the gripping device is possible. It is advantageous for the gripping device to be designed in the manner of clamps and, in order to hold the containers, it advantageously grips them in a region of their mouth and, in particular, below a bulge which is situated on the external periphery of this mouth, such as for example a carrying ring. The containers are advantageously plastics material containers, and in particular plastic bottles. The apparatus according to the invention, however, is also capable of being used for conveying plastics material pre-forms or even glass bottles. It is advantageous, however, for empty containers to be treated or conveyed respectively by the apparatus according to the invention.

Furthermore, the problem can arise that the lifting cam does not switch up if the transfer is no longer in synchronism. The problem also arises that lifting units of this type jam and must therefore be lubricated regularly. A lubrication means of this type is arranged above the product in this case.

In addition, the further turning of the containers is also different after leaving a turning device, so that exactly the same rotary setting is not always achieved. In addition, oscillation of the conveying device or the star wheel respectively can also occur, since the dipping and the extraction take place very quickly and high forces of the cams can occur.

In addition, the situation occurs in part that the containers remain standing briefly in the event of a direct transfer into the air conveyor. In addition, the problem can also arise that the containers do not drop sufficiently quickly out of the air conveyor when the guide opens. Use is also made in part of very steep guide cams which cause the mandrels which engage in the mouth of the containers to dip and withdraw. These steep cams result from the necessity of a rapid transfer from the gripper elements. High outputs of the machine are prevented, however, by these relatively steep cams.

Furthermore it would be desirable, in the case of certain containers, for example in the case of round containers, for an increase in the speed of the plant to be achieved by the rotational function being switch off. In this case the subject matter of the present invention provides a remedy. It is therefore proposed that the container can be held at least for a time both by the gripping element and by the holding device. In this way, many problems, for example the rapid dipping and withdrawal, can be reduced.

In this case the treatment of the containers can be treatments which are selected from a group of treatments, which include labelling of the containers, rinsing of the containers, sterilization of the container, inspection of the containers, rotation of the containers or even conveying of the containers. In particular, the containers are rotated at least with respect to the longitudinal axis thereof or a direction parallel to the longitudinal axis by the apparatus according to the invention. This rotation is carried out in this case in particular for the purpose of alignment of the containers.

In the case of an advantageous embodiment the holding device is arranged above the gripping element. It is advantageous for the number of the holding and gripping elements also to be the same, in which case it is possible for the gripping elements to be moved in synchronism with the holding devices. In this case it is likewise possible for the holding devices to be arranged on a movable, and in particular rotatable, carrier. In this way, in the case of this embodiment precisely one holding device is allocated to each gripping element.

In addition, it is preferable for the conveying device to have a conveying wheel rotatable about a central axis. It would also be possible, however, for the conveying to be by way of chains, belts or the like.

In addition, it would be possible for additional treatment steps also to be carried out, such as for example a sterilization of the containers, with the apparatus according to the invention.

In addition, it is also possible for an orientation unit which has the holding devices mentioned above to be designed in the form of a module, so that this orientation unit can also be retrofitted even in the case of existing plants or conveying star wheels respectively. In this way, a conveying star wheel known per se from the prior art can be converted into an orientation star wheel.

On account of the apparatus according to the invention simple transfers in and out of the orientation star wheel are achieved. In addition, a uniform rotation of the individual containers is made possible. In particular, the modules produced in this way are likewise capable of treating containers which are not orientated.

In this way, it is advantageous for the gripping element to grip the containers in a region in which they are made symmetrical with respect to rotation. The holding device holds the containers, as mentioned above, likewise in an mouth region.

It is advantageous for the holding device to be a mandrel which is introduced in the interior of the mouth and which, in this way, holds the containers from the inside.

In the case of an advantageous embodiment the holding devices are rotatable in each case about a pre-set axis of rotation, namely in such a way that containers arranged on the holding devices are rotatable about their longitudinal axis or an axis parallel to this longitudinal axis.

In the case of a further advantageous embodiment the apparatus has a control device which causes that the containers are held in sections only by the gripping devices and in sections only by the holding devices along their conveying path. In this case the apparatus can be designed in such a way that the containers are held initially only by the gripping devices, for example after the containers have been transferred from a further apparatus, such as a conveying star wheel, to the apparatus according to the invention.

This means that the apparatus according to the invention can operate at least in the initial region thereof exactly like a conventional conveying apparatus. After that, the containers are advantageously held by the holding devices, i.e. the mandrels mentioned above preferably engage in the mouths. In this way, it is possible for the containers to be rotated about the longitudinal direction thereof, in which case it is at the same time advantageous for the gripping devices to be loosened or released for this purpose. After the rotation has been carried out, the gripping devices can engage again in the containers and the holding devices can be removed accordingly, for example withdrawn.

In the case of a further advantageous embodiment the holding devices are movable with respect to the containers in a longitudinal direction of the containers. In this way, the holding devices can be introduced in particular into a mouth of the containers and can also be extracted from it again. In this case it is possible for the containers themselves to be raised and lowered. It is advantageous, however, for the holding devices themselves to be raised and lowered again for this procedure. In addition, it is possible for the holding devices to be arranged above the containers or above the conveying path of the containers respectively and, in this way, to engage in the mouths of the containers from above. It would also be possible in the case of certain plants, however, for the containers to be conveyed head first and thus for the holding devices to engage in the containers from below.

In the case of a further advantageous embodiment the apparatus has a drive device for rotating the holding device. In this case for example a belt can be provided which rotates the individual holding devices about the axis thereof. It would also be possible, however, for each holding device to have a separate drive, for example in the form of a servo motor. In this way, an individual rotation of the individual containers about the longitudinal axis thereof is possible.

In the case of a further advantageous embodiment the apparatus has a detection device which detects a rotational setting of the individual containers. As a reaction to a rotational setting detected in this way, the alignment can be carried out by a specified rotation of the container.

In the case of a further advantageous embodiment a holding of the containers by the holding devices is activatable and de-activatable during the conveying of the containers. This design is suitable so that it is possible for even those containers which for example are made circular and which need not therefore be aligned with respect to the rotational setting thereof to be treated in a simple manner with the same apparatus. The de-activation of the holding device can be carried out in this case in such a way that a sinking of the holding devices into the containers no longer takes place on the one hand and the latter are held only by the gripping devices during the complete conveying of the containers on the other hand. In this case the apparatus according to the invention acts as a conventional conveying star wheel for the containers.

The present invention further relates to a plant for treating of containers with an apparatus of the type described above and a treatment device which is arranged downstream of the apparatus in the conveying direction of the containers and which treats the containers in a pre-set manner. This further treatment device can be for example a labelling device or a sterilization device. In addition, it would also be possible for a conveying device such as a conveying star wheel to be arranged between the apparatus described above and the further treatment device. It would also be possible, however, starting from the apparatus according to the invention, for the containers to be transferred for example also by way of a further conveying device to an air conveyor.

The present invention further relates to a method for treating containers, in which the containers are conveyed along a pre-set conveying path by means of a conveying device and are gripped for a time in at least one region of the external periphery thereof by gripping elements during this conveying. In this case the gripping elements are transferred from a closed state into an opened state during the conveying of the containers in order to at least loosen the engagement of the gripping devices in the containers. In particular, a relative rotation of the containers with respect to the gripping devices is to be made possible by the transfer in the opened state. In the case of a preferred method the containers are conveyed in a non-filled state by the conveying device.

According to the invention the containers are gripped at the mouth region thereof and/or are supported at the base or base region respectively thereof in part by holding devices during their conveying, each container being held and conveyed for a time by a gripping element or by one of the gripping elements and for a time by a holding device or by one of the holding devices during its conveying.

If the holding device supports the base of the containers, it may be sufficient for the holding devices to support the base at least in part or at a few points. It would also be possible for the holding devices to support the containers at a transition region in which the base of the container passes into a main body of the container. In addition, however, discs of this type can also contact the containers at the peripheral wall thereof in order to stabilize the containers with respect to the holding devices. In addition, holding devices of this type which hold the containers from below could also have receiving shells for receiving a base region of the containers.

It is therefore proposed in particular with respect to the method that by means of a combined holding of the containers both with the gripping elements and with the holding devices an alignment of the latter can be carried out, in particular by rotating the containers with respect to the longitudinal axis thereof. It is advantageous for the holding devices and the gripping devices to contact the containers at different regions of the containers and it is particularly preferred for the holding devices to contact the containers on the inner wall thereof (including an inner wall of the mouth region of the containers).

In the case of a further advantageous method the containers are rotated about the longitudinal axis thereof during the conveying thereof along the conveying path. It would also, however, as mentioned above, be possible for the rotation to take place about an axis parallel to the longitudinal axis.

In the case of a further advantageous method the containers are held and conveyed along the conveying path first by the gripping elements, then by the holding devices and finally again by the gripping elements. In the case of a further advantageous embodiment the holding devices are moved at least for a time with respect to the containers in the longitudinal direction of the containers. This movement is carried out in this case in particular in order to introduce the holding devices into the mouths of the containers and in order to withdraw the holding devices subsequently from the containers again.

Further advantageous embodiments are evident from the accompanying drawings. In the drawings FIG. 1 is a diagrammatic illustration of a method sequence according to the prior art;

FIG. 2 is a diagrammatic illustration of a method sequence according to the invention;

FIGS. 3a to d are four illustrations of a method sequence according to the invention;

FIG. 4 is an illustration of a plant concept according to the invention;

Figure 3A:
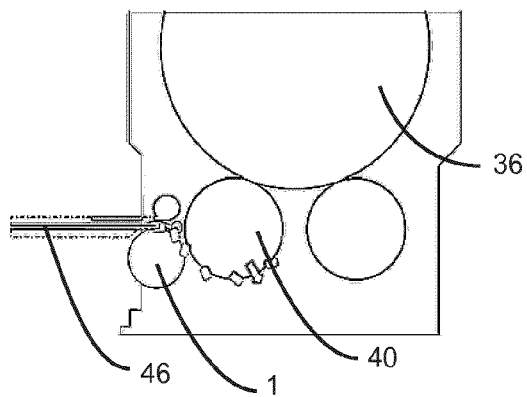

FIG. 1 shows diagrammatically a method sequence according to the prior art. In this case the containers 10 which have a rectangular cross-section in this case are transferred from a conveying device such as a conveying star wheel 98 to a conveying unit 100. Starting from this conveying unit 100 the containers arrive either at an air conveyor 102 (variant a), at a conveying wheel 104 and an air conveyor 108 attached thereto (variant b) or at a conveying wheel 106 (variant c). In all the variants a mandrel is introduced into the mouths of the containers in the method steps I a, I b, I c. It is evident that in this case the angle of this introduction is relatively small and, in this way, the introduction of the mandrel must take place very quickly.

In the same way, in method step II which is the same for all the variants the containers are turned with respect to the longitudinal axis thereof. In the case of variant a the mandrel is withdrawn in the process step IIIa, in the case of variant b the mandrel is withdrawn in the process step IIIb, and in the case of variant c the mandrel is withdrawn in the process step IIIc. In the case of variant b the mouth of the containers is then observed in step IV b. On account of this design the problems mentioned above arise, such as for example a non-exact dipping of the mandrel into the mouth in method step I.

As mentioned above, one object of the invention is to increase the output of the machines for example up to 63,000 containers per hour.

FIG. 2 is an illustration of a procedure according to the invention. In this case the variant a with the air conveyor directly attached to the conveying device, as shown in FIG. 1, i.e. the apparatus 1 according to the invention, has been omitted. The reference number 2 refers in this case to the conveying device as a whole, which can be for example a conveying wheel. A plurality of gripping elements 4, which first grip the containers 10 and take them on from the conveying device 40, are provided in this conveying wheel. After that, holding mandrel 6a dip into the mouths of the containers 10 at the process angle Ib, c.

It is evident that in this case the process angle in the method step I is considerably larger than in the prior art, i.e. not nearly such steep guide cams are used as in the case of the variant according to the prior art shown in FIG. 1. As soon as the holding mandrels 6a have engaged in the mouths of the containers, the gripping clamp 4 opens and the containers are now held directly by the mandrels.

The individual holding mandrels with the containers 10 arranged thereon are rotated with the aid of a drive device 20 and, in this way, a rotation of the containers about the longitudinal axis thereof is carried out. This constitutes the method step IIb, c which is likewise uniform for all the containers.

In the method step IIIb, c the holding mandrel is withdrawn again, in which case too the process angle is considerably larger than in the prior art. At the same time the gripping elements engage again and in turn hold the containers instead of the holding mandrels. After that, in the case of the variants b and c the containers are again transferred to conveying devices 42 and 44 respectively, which can be for example conveying star wheels. The conveying device 44 is again followed by an air conveyor 46. The reference number 50 refers to an inspection device which is optionally present and which inspects the mouths of the containers. The reference number 30 refers to a further inspection device which inspects an angle of rotation of the containers, in the event that the containers 10 are rotated individually.

In the case of this design the transfer of the containers from the conveying into orientation star wheel or the conveying apparatus 1 respectively is carried out by way of a conventional conveying star wheel. In this case the apparatus can be designed in such a way that an orientation unit with the rotational holding devices is set up in a modular manner by way of a conventional neck-handling star wheel. The orientation of the containers is carried out furthermore by way of a conveying mandrel which engages in the mouth of the containers.

The transfer from the lower neck-handling star wheel is carried out by dipping this holding mandrel 6a into the mouth and, after that, as mentioned above, the gripping element 4 is opened. In the case of the embodiment shown in FIG. 2 the rotation of the containers is furthermore carried out by an asynchronous motor by way of a belt. In some variants it is possible to replace this asynchronous motor with a servo motor. An advantage of this embodiment lies in the fact that the belt can run in synchronism with the conveying device in all operating conditions.

In the case of a further method it would also be possible for each individual holding mandrel or each individual holding device 6 respectively to be rotated separately by way of servo stepping motors. As mentioned above, in the case of a further embodiment a camera can detect or define respectively the angle of rotation for each individual container.

During the withdrawal, as mentioned above, the gripping elements 4 are first closed again and, after that, the holding device 6 is withdrawn. The transfer into the following conveying star wheel can then be carried out again by way of neck handling known from the prior art. It is thus advantageous for the containers to be held at least for a time both by a gripping element 4 and by a holding device 6. The gripping devices 4 are preferably always situated below the holding devices in the longitudinal direction of the containers. If the holding device supports a base region of the containers, i.e. is designed for example in the form of a rotary disc below the bottle, the holding device will be above the gripping device. In this context it is pointed out that, instead of holding devices which engage in a mouth of the containers, holding devices would also be possible which support the containers from below.

Furthermore it is possible to switch off the dipping and withdrawal of the holding devices as a bypass for round containers. Furthermore it would also be possible for the orientation system to be applied subsequently if the customer or the user respectively initially runs only round containers. Furthermore it would also be possible in this way for some of the guide fittings known from the prior art to be omitted.

Concerning the improvements with respect to the previous system it can be stated that more precise transfers are now possible without rotating the containers and also a simple setting of all the transfers is capable of being carried out. In this way, even high outputs are also made possible with moulded containers, i.e. containers which have cross-sections deviating from circular cross-sections.

FIGS. 3a to 3d show four designs of an apparatus according to the invention. In the case of the variant shown in FIG. 3a a treatment unit 36, such as for example a filling machine or a blow moulding machine, is followed by a conveying wheel 40, and this in turn is followed by the apparatus 1 according to the invention. This apparatus 1 according to the invention is directly followed in this case by an air conveyor 46, i.e. the transfer of the containers takes place from the orientation directly into an air or belt conveyor.

Figure 3B:
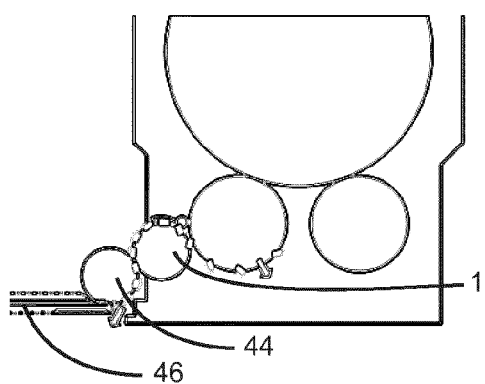

In the case of the embodiment shown in FIG. 3b the apparatus 1 is followed first by a further conveying star wheel 44 and only then by an air or belt conveyor 46 respectively. In this case, as mentioned above, a further observation of the mouth of the containers is optionally possible.

Figure 3C:
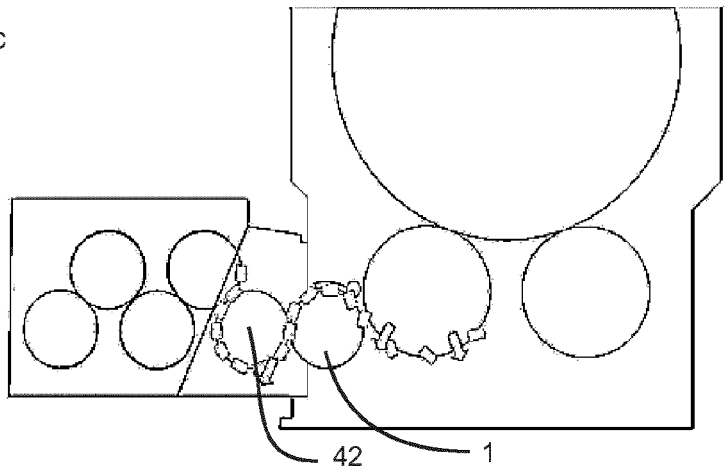

In the case of the variant shown in FIG. 3c the apparatus 1 is followed by a further conveying star wheel 42. In this case the transfer of the containers takes place directly into the conveying star wheel, for example to a filler interface.

Figure 3D:
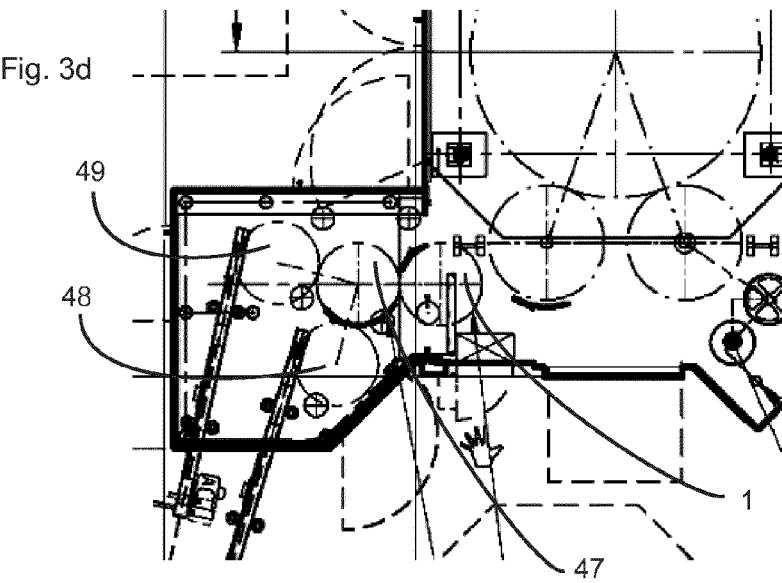

FIG. 3d diagrammatically shows further possibilities of special run-outs, in which case the apparatus 1 according to the invention can be followed by different conveying star wheels 47, 48 and 49.

FIG. 4 is an overall illustration of a possible apparatus according to the invention with enlarged partial illustrations A, B and C. In this case a blow moulding machine 36 is again provided which transfers the containers to the apparatus 1 by way of a run-out star wheel 37. The apparatus 1 is followed in turn by a conveying device 42, in the region of which the containers can be brought out into a bottle carriage 53 by way of a conveyor belt 52 for example, as is shown more precisely in the enlarged illustration A. In addition, however, a transfer to a conveying wheel 54 would also be possible, and this is likewise shown by the enlargement B. In this region it would be possible for guide segments 74 to produce a further rotation of the containers about the longitudinal axis thereof.

Furthermore, it would also be possible for the containers to be transferred to a conveying element or a conveying device 56 respectively and in this region to be introduced by 2 guide segments 62 and 63 into receiving pockets 66, so that they are also precisely orientated in this case with respect to the rotational setting thereof. The reference 10a designates an mouth of the containers. The reference number 90 refers to a further treatment device such as for example a filling device for the containers.

Figure 5:
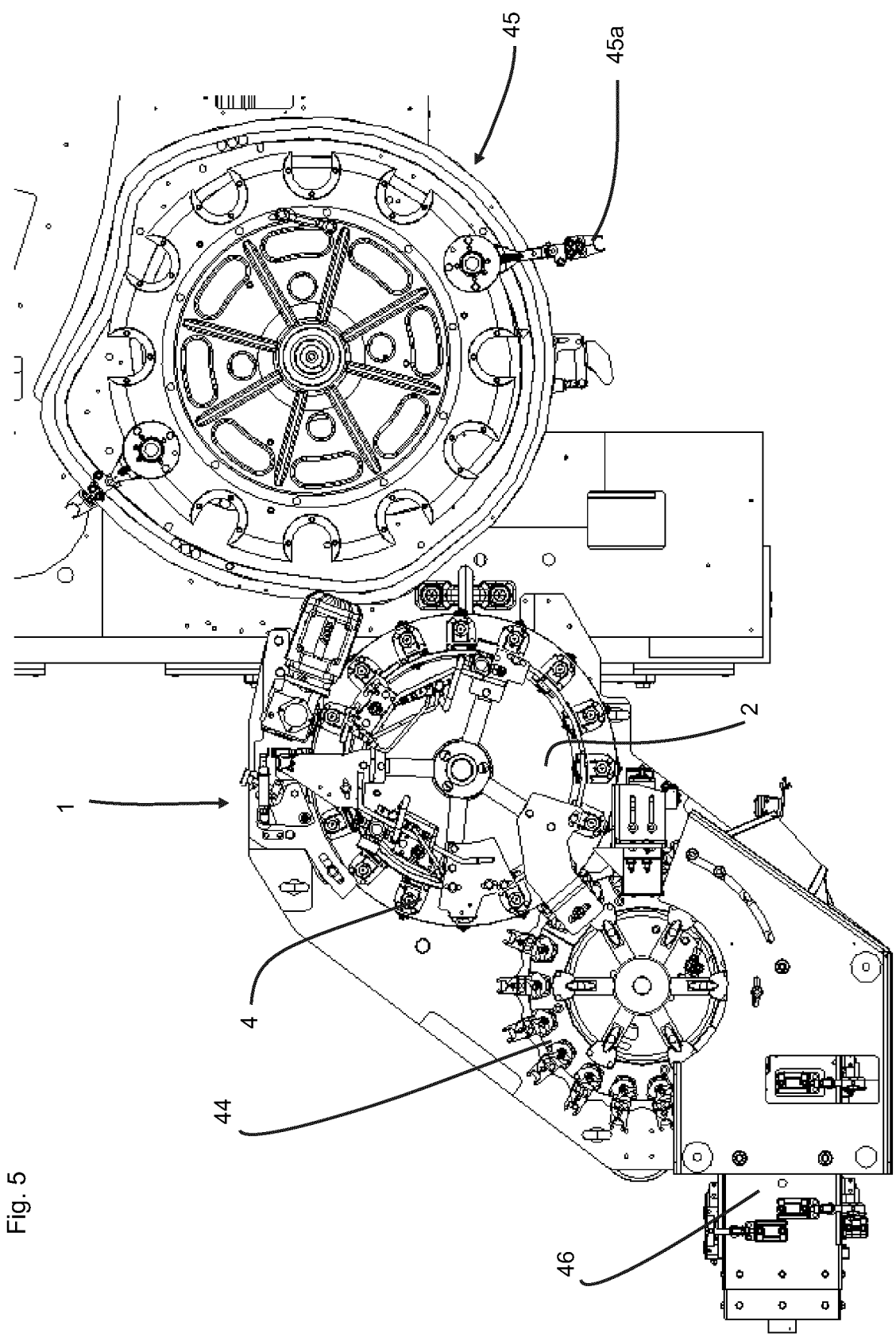
FIG. 5 is a further illustration of a method sequence according to the invention.

FIG. 5 is a further illustration of a plant according to the invention. In this case too, a conveying star wheel 45 is provided on which a plurality of gripping elements 45a are provided which, however, are additionally pivotable about pivot axes, so that the conveying device 45 is designed in the form of a division delay star wheel which can change a division between the individual containers. This conveying star wheel 45 is followed in turn by the apparatus 1 according to the invention which is used to orientate the rotational setting of the containers. In this way, the containers are transferred in this case on a mandrel from the division delay star wheel 45 into the apparatus 1 and there they are rotated by a defined angle and then transferred into the further conveying device 44 and the air conveyor 46.

Figure 6:
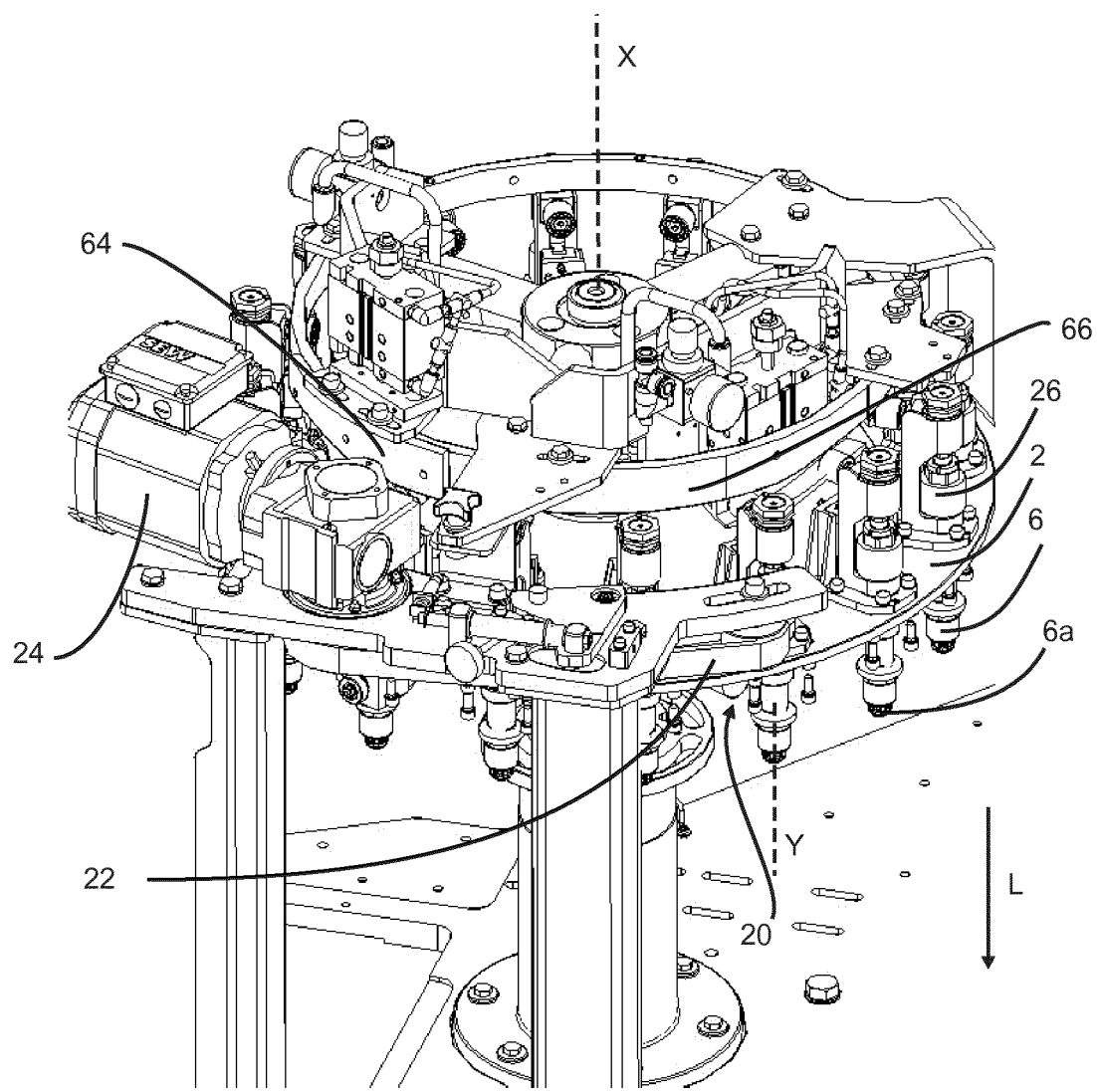
FIG. 6 is an illustration of an apparatus according to the invention.

FIG. 6 is an illustration of an apparatus 1 according to the invention. In this case the conveying device 2 is again evident, which is designed in this case in the form of a rotatable circular carrier on which are arranged a plurality of holding devices 6. These holding devices 6 are movable in this case by way of a lifting cam 64 in their longitudinal direction, i.e. the direction L which at the same time is also a longitudinal direction of the container.

The reference number 66 designates a further lifting cam which is responsible for the re-setting of the holding devices 6 or the holding mandrels 6a respectively from the container mouths. In addition, the containers are gripped at the mouths thereof or below the carrying ring respectively by gripping elements 4 which are not illustrated here. In addition, the gripping elements 4 are arranged in a rotatably movable manner or on the conveying device 2 respectively in this case. The conveying device rotates in this case about a central axis of rotation X. The reference number 20 designates as a whole a drive device which rotates the holding devices 6 about the respective axes y thereof, in order also to rotate the containers 10 in this way. This drive device has in this case a circulating belt 22 which is driven by a drive unit such as a motor 24, in order to produce a uniform rotation of the individual holding devices 6 or the holding mandrels 6a respectively in this way. For this purpose this belt can contact a contact area 26 of the holding devices 6 and can rotate this contact area 26 and thus also the holding mandrel 6a allocated to this contact area 26. The contact area 26 is thus rotatable with respect to the conveying device 2.

Figure 7:
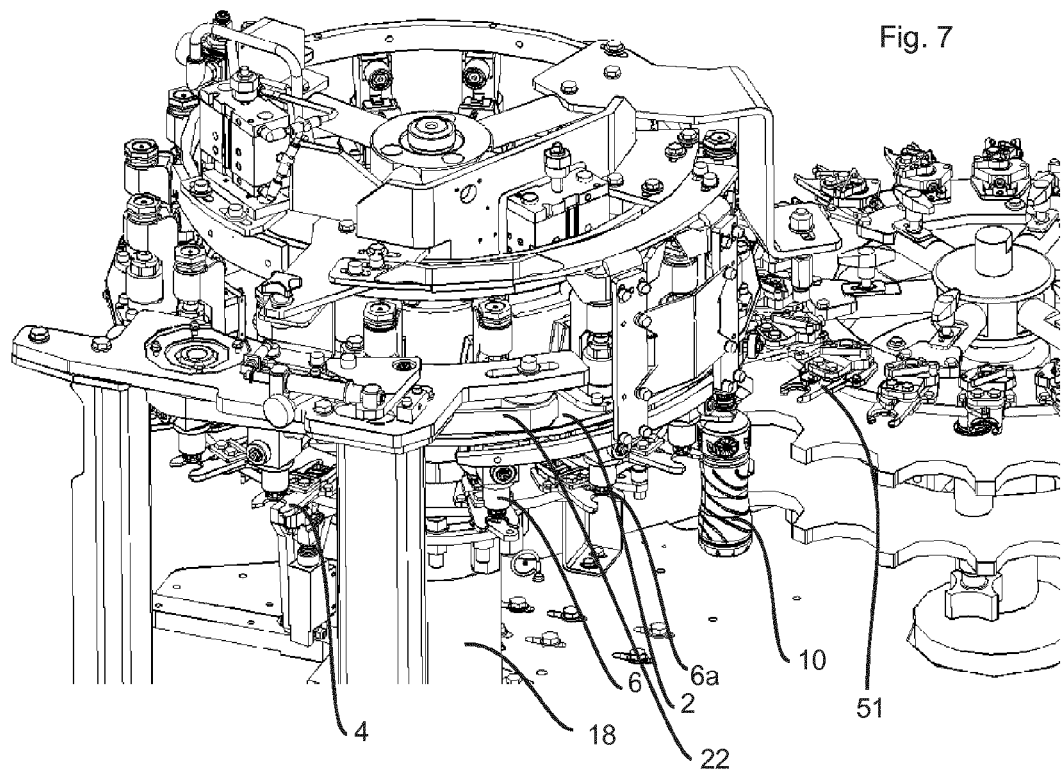
FIG. 7 is a further detailed illustration of the apparatus shown in FIG. 6.

FIG. 7 is a further illustration of the apparatus according to the invention. The reference number 18 designates a central drive for driving the conveying device 2. The reference number 51 relates to further gripping clamps which are used for transferring or taking on the containers to or from apparatus 1. These gripping clamps are preferably offset vertically with respect to the gripping elements 4 in the longitudinal direction of the containers 10 in this case.

Figure 8:
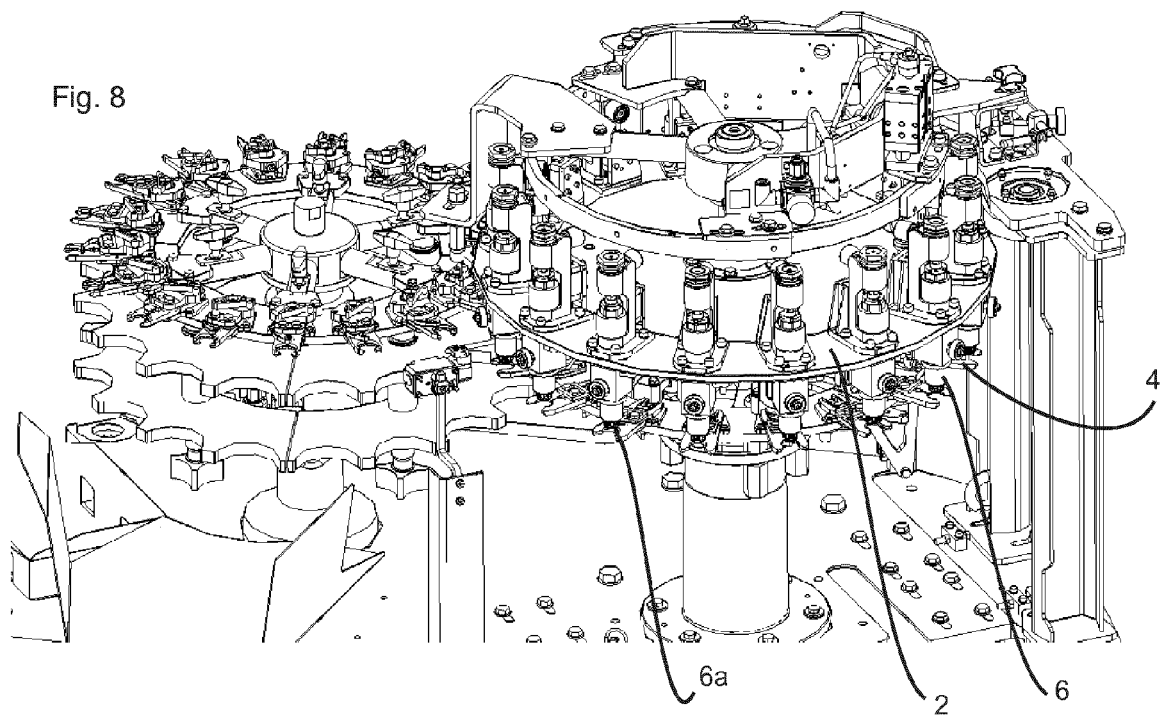
FIG. 8 is a further illustration of the apparatus according to the invention.
Figure 9:
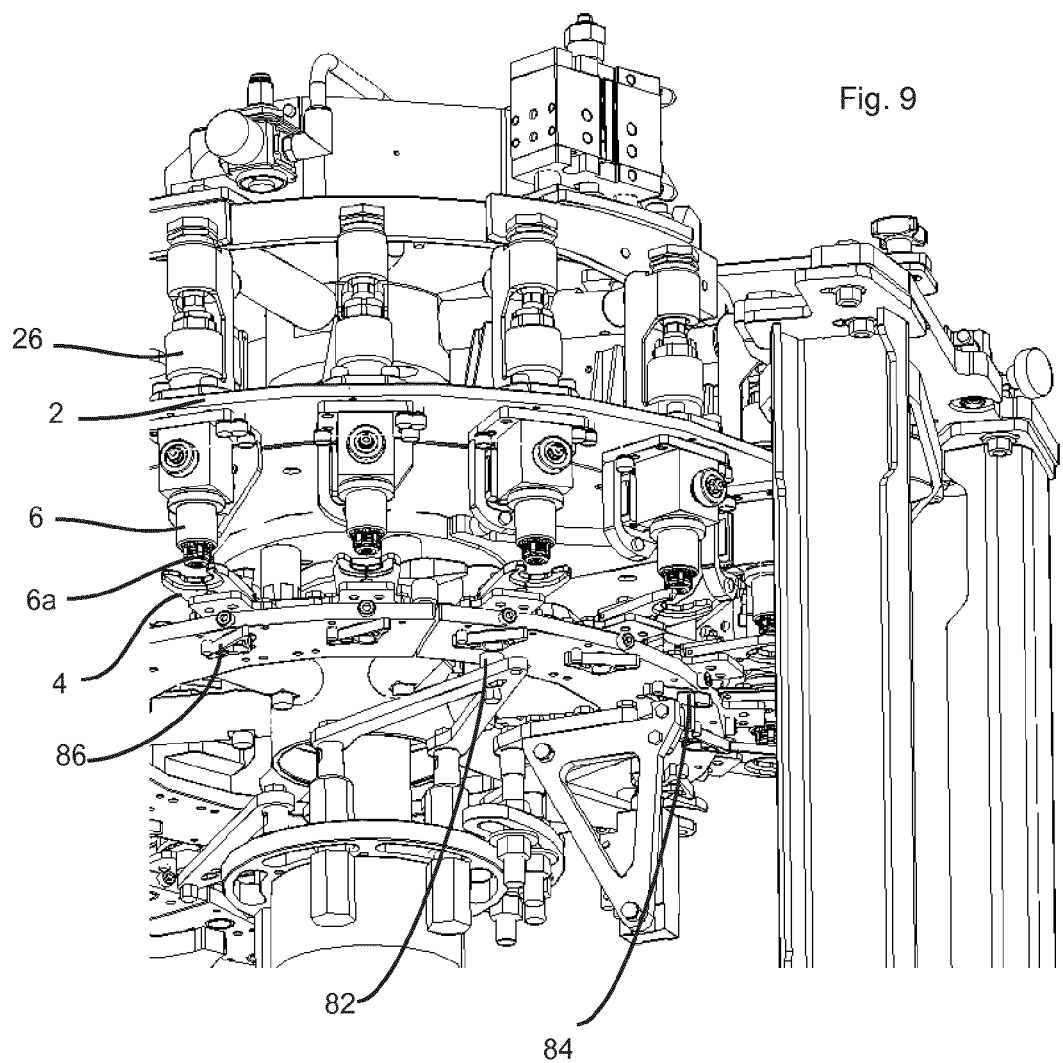
FIG. 9 is a further detailed illustration of the apparatus.

FIGS. 8 and 9 are further illustrations of an apparatus 1 according to the invention. The conveying device 2 is again evident in this case, on which are arranged a plurality of controllable gripping elements 4 (only one shown diagrammatically). In the case of this variant the gripping elements 4 are opened or closed in each case with setting segments 82, 84 (cf. FIG. 9). These setting segments 82, 84 produce in this case a pivoting of pivotable setting members 86 which are coupled to the gripping elements in such a way that a pivoting of these setting members 86 leads to the gripping elements 4 being opened or closed. Taken precisely, these setting members 86 cause that the gripping elements 4 are capable of being transferred from an opened position into a closed one and vice versa. It would also be possible, however, for the individual gripping elements to have separate drives in each case in order to switch between an opening movement and a closing movement. In this case for example magnetic drives, hydraulic drives, pneumatic drives and the like are possible.

Figure 10:
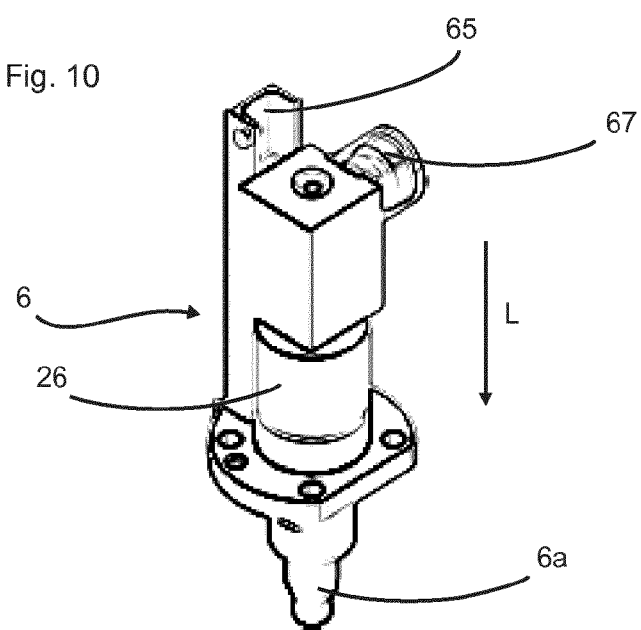
FIG. 10 is an illustration of a lifting unit of an apparatus according to the invention.

FIG. 10 is an illustration of a holding device 6. In this case the area 6a which can dip into the container is again shown, as well as a guide 65 with respect to which the holding mandrel 6a is movable in the direction L. The reference number 67 designates a cam roller which rolls with respect to the guide cam 64 shown in FIG. 7 and which, in this way, produces the longitudinal movement of the holding mandrel 6a. The guide rail 65 is arranged in this case, as mentioned above, on the conveying device 2 in a fixed manner.

In this case too, the holding devices 6 which engage in a mouth of the mandrel are again provided. It is possible for fewer or more holding devices to be provided than gripping elements, but as a rule the numbers of the gripping elements and of the holding devices 6 are equal.

The Applicants reserve the right to claim all the features disclosed in the application documents as being essential to the invention, insofar as they are novel either individually or in combination as compared with the prior art.

LIST OF REFERENCES 1 conveying apparatus/apparatus according to the invention
2 conveying device
4 gripping elements/gripping clamps
6 holding device
6a holding mandrels
10 containers
20 drive device
22 circulating belt
24 motor
26 contact area of the holding device
30 further inspection device
36 treatment unit, blow moulding machine
37 run-out star wheel
40, 42, 44 conveying device/conveying wheel
45 conveying star wheel/division delay star wheel/conveying device
45a gripping elements
46 air conveyor
47, 48, 49 conveying star wheels
50 inspection device
51 further gripping clamp
52 conveyor belt
53 bottle carriage
56 conveying device
62, 63 guide segment
64 lifting cam
65 guide rail
66 receiving pocket
67 cam roller
74 guide segment
82, 84 setting segment
86 setting member
90 filling device
98 conveying star wheel (prior art)
100 conveying unit (prior art)
102 air conveyor (variant a) (prior art)
104 conveying wheel (prior art)
108 air conveyor (variant b) (prior art)
106 air conveyor (variant c) (prior art)
X, Y axis
I-IV method steps

The invention claimed is:

1. An apparatus for treating containers, comprising:
a first movable conveying device for conveying the containers along a pre-set conveying path;
a plurality of clamp-like gripping elements arranged on the first movable conveying device, wherein the gripping elements transition between a closed state, in which a container of the containers is gripped by a gripping element of the plurality of clamp-like gripping elements, and an opened state, in which a grip of the container is at least loosened by the gripping element, wherein the conveying device further includes a plurality of holding devices which are brought into engagement with a mouth region of the container or which support the container on a base region thereof, wherein both one gripping element of the gripping elements and one holding device of the holding devices are associated with at least one container during the conveying thereof by the apparatus at least for a time for the conveying thereof, and wherein the holding devices are movable with respect to the containers in a longitudinal direction of the containers, and wherein the gripping element grips the container in the mouth region of the container only from one side relative to the container.

2. An apparatus according to claim 1, wherein the holding devices are rotatable about a pre-set axis of rotation, in such a way that containers arranged on the holding devices are rotatable about their longitudinal axis or an axis parallel to the longitudinal axis.

3. An apparatus according to claim 1, wherein the apparatus has a control device which causes the containers to be held in sections by the gripping devices and in sections by the holding devices along their conveying path.

4. An apparatus according to claim 2, wherein the apparatus has a drive device that rotates the holding devices.

5. An apparatus according to claim 1, wherein a holding of the containers by the holding devices is activatable and de-activatable during the conveying of the containers.

6. A plant for treating containers with an apparatus according to claim 1 and a treatment device which is arranged downstream of the apparatus in the conveying direction of the containers and which treats the containers in a pre-set manner.

7. A method for treating containers, comprising:
conveying, by a conveying device, the containers along a pre-set conveying path;
gripping, by gripping elements, the containers for a time in at least one region of the external periphery of the conveying device during the conveying;
transitioning the gripping elements from a closed state into an opened state during the conveying of the containers in order to at least loosen the engagement of the gripping devices in the containers, wherein the containers are gripped at a mouth region of the containers or are supported at the base of the containers at least in part by one or more holding devices during the conveying, wherein each container is held and conveyed for a time by one of the gripping elements and for a time by one of the holding devices during its conveying, and wherein the holding devices are movable with respect to the containers in a longitudinal direction of the containers, and wherein the gripping elements grip the containers in the mouth region of the containers only from one side relative to the containers.

8. A method according to claim 7, wherein the containers are rotated about a longitudinal axis thereof during the conveying thereof along the conveying path.

9. A method according to claim 7, wherein the containers are held and conveyed along the conveying path thereof first by the gripping elements, then by the holding devices and finally again by the gripping elements.

10. A method according to claim 7, wherein the holding devices are moved at least for a time with respect to the containers in a longitudinal direction of the containers.

11. An apparatus for treating containers, comprising:
a first movable conveying device for conveying the containers along a pre-set conveying path;
a plurality of clamp-like gripping elements arranged on the first movable conveying device, wherein the gripping elements transition between a closed state, in which a container of the containers is gripped by a gripping element of the plurality of clamp-like gripping elements, and an opened state, in which a grip of the container is at least loosened by the gripping element, wherein the conveying device further includes a plurality of holding devices which are brought into engagement with a mouth region of the container or which support the container on a base region thereof, wherein both one gripping element of the gripping elements and one holding device of the holding devices are associated with at least one container during the conveying thereof by the apparatus at least for a time for the conveying thereof, and wherein the holding devices are rotatable about a pre-set axis of rotation, in such a way that containers arranged on the holding devices are rotatable about their longitudinal axis, and wherein the gripping element grips the container in the mouth region of the container only from one side relative to the container.

12. An apparatus according to claim 1, wherein the holding device includes a mandrel which engages in the mouths of the containers.

13. An apparatus according to claim 1, wherein the holding device supports the container at its base.

14. An apparatus according to claim 1, wherein the holding device is constructed arranged in the form of a holding disc, and wherein the holding disc is positioned below the gripping elements.

15. An apparatus according to claim 14, wherein the holding disc is a rotatable holding disc.

16. A method according to claim 7, wherein the holding device includes a mandrel which engages in the mouths of the containers.

17. A method according to claim 7, further comprising: supporting, by the holding device, the container at its base.

18. A method according to claim 7, wherein the holding device is constructed arranged in the form of a holding disc, and wherein the method further comprises positioning the holding disc below the gripping elements.

19. A method according to claim 18, wherein the holding disc is a rotatable holding disc.

20. The apparatus according to claim 1, wherein the gripping elements are pivotably connected to each other.

21. The apparatus according to claim 1, wherein the gripping elements grip the containers in a region in which they are made symmetrical with respect to rotation.

22. The apparatus according to claim 1, further comprising a conveying star wheel that communicates with the first movable conveying device, wherein a plurality of gripping elements are provided on an outer circumference of a conveying star wheel.

23. The apparatus according to claim 22, wherein the gripping elements on the conveying star wheel are pivotable about pivot axes so that the conveying star wheel can change a division between individual containers of the containers.

24. The apparatus according to claim 4, wherein the drive device rotates the holding devices about the longitudinal axes of the holding devices, respectively, for rotating the containers.

25. The apparatus according to claim 4, wherein the drive device includes a circulating belt which is driven by a drive unit in order to produce a uniform rotation of the holding devices or holding mandrels.

26. The apparatus according to claim 25, wherein the belt contacts a contact area of the holding devices and rotates the contact area and a holding mandrel allocated to the contact area.

27. The apparatus according to claim 26, wherein the contact area is rotatable with respect to the conveying device.

28. The apparatus according to claim 1, further including a plurality of setting segments, wherein the gripping elements are opened or closed with the setting segments.

29. The apparatus according to claim 28, further comprising a plurality of pivotable setting members, wherein the setting segments produce a pivoting of the pivotable setting members which are coupled to the gripping elements in such a way that a pivoting of the setting members translates to the gripping elements being opened or closed.

30. The apparatus according to claim 29, wherein the setting members cause the the gripping elements to transition from an open position to a closed position and vice versa.

31. The apparatus according to claim 1, wherein each gripping element has a separate drive to switch between an opening movement and a closing movement.

32. The apparatus according to claim 31, wherein the drives include at least one of a magnetic drive, hydraulic drive, or pneumatic drive for driving the gripping elements.

* * * * *